(12) United States Patent
Oguguo et al.

(10) Patent No.: US 10,924,043 B2
(45) Date of Patent: Feb. 16, 2021

(54) GENERATOR SET EXERCISING SYSTEM

(71) Applicant: Cummins Power Generation Limited, Ramsgate (GB)

(72) Inventors: Ikenna Oguguo, Canterbury (GB); Philippe Goesel, Ramsgate (GB); Andrew C. Walseth, Mounds View, MN (US)

(73) Assignee: Cummins Power Generation Limited, Ramsgate (GB)

( * ) Notice: Subject to any disclaimer, the term of this patent is extended or adjusted under 35 U.S.C. 154(b) by 16 days.

(21) Appl. No.: 16/200,320

(22) Filed: Nov. 26, 2018

(65) Prior Publication Data
US 2020/0169200 A1 May 28, 2020

(51) Int. Cl.
*H02P 9/04* (2006.01)
*F02D 29/06* (2006.01)
*F02D 31/00* (2006.01)

(52) U.S. Cl.
CPC ............ *H02P 9/04* (2013.01); *F02D 29/06* (2013.01); *F02D 31/001* (2013.01)

(58) Field of Classification Search
CPC ........... H02P 9/04; F02D 29/06; F02D 31/001
See application file for complete search history.

(56) References Cited

U.S. PATENT DOCUMENTS

| 6,631,310 | B1* | 10/2003 | Leslie | H02P 9/00 700/21 |
| 7,230,345 | B2 | 6/2007 | Winnie et al. | |
| 7,573,145 | B2 | 8/2009 | Peterson | |
| 2003/0102716 | A1* | 6/2003 | Schultz | H02J 3/38 307/19 |
| 2010/0018673 | A1 | 1/2010 | Yang | |
| 2010/0102637 | A1* | 4/2010 | Dozier | H02P 9/08 307/84 |
| 2012/0292992 | A1* | 11/2012 | Williams | H02J 3/28 307/23 |
| 2014/0197644 | A1* | 7/2014 | White | H02P 9/04 290/40 R |
| 2014/0265354 | A1* | 9/2014 | Folken | H02P 9/42 290/40 E |
| 2016/0215666 | A1* | 7/2016 | Dorn | F01N 9/002 |

(Continued)

OTHER PUBLICATIONS

Howard, "Secure Power Supplies for British Telecom's Major Computer Centres", Institute of Electrical and Electronics Engineers, Proceedings of the International Telecommunications Energy Conference (INTELEC)., Oct. 15, 1989, pp. 19.7: 1-19.7: 7.

(Continued)

*Primary Examiner* — Viet P Nguyen
(74) *Attorney, Agent, or Firm* — Foley & Lardner LLP (57) ABSTRACT

Systems and apparatuses include a control unit structured to communicate with a first generator set, a second generator set, and a third generator set, operate the first generator set as an output generator in an exercise mode, and operate the second generator set and the third generator set as load generators in the exercise mode to use electrical power produced by the first generator set. The second generator set uses a second genset portion of the electrical power and the third generator set uses a third genset portion of the electrical power.

20 Claims, 3 Drawing Sheets

(56) References Cited

U.S. PATENT DOCUMENTS

2019/0140454 A1\* 5/2019 Chase ...................... H02P 9/04

OTHER PUBLICATIONS

International Search Report and Written Opinion for International Application No. PCT/IB2019/060130, dated Feb. 12, 2020, 11 pages.
Nochumson et al., "Transfer Considerations in Standby Generator Application", IEEE Transactions on Industry Applications, IEEE Service Center, col. 43, No. 5, Sep. 1, 1979, pp. 560-569.

\* cited by examiner

GENERATOR SET EXERCISING SYSTEM

TECHNICAL FIELD

The present disclosure relates to exercising systems for generator sets. More particularly, the present disclosure relates to systems and methods for exercising generator sets connected to a mixed power source grid.

BACKGROUND

Large buildings often include a generator backup system arranged to provide power in the event of a power failure within a power grid. Additionally, generator sets may be integrated into multi-source power grids include renewable energy such as wind power or solar power. The generator sets may provide additional power to meet the demands of the power load during peak usage times or during lulls in other power production (e.g., no wind, or cloud cover days).

In systems where generator sets are not used on a regular basis, a load cell or load bank is used to exercise the generator sets. Load banks are sized to develop an electric load corresponding with an output of the generator set. Connecting the load bank to a generator set allows the generator set to run for a predetermined period of time. Exercising demonstrates that engine and generator set subsystems are functioning, meets code or standards requirements, provides distribution of lubricant oil to engine components, provides corrosion inhibitor throughout the cooling system, and other functions. In some installations, generator sets are exercised once per month.

SUMMARY

One embodiment relates to an apparatus that includes a control unit structured to communicate with a first generator set, a second generator set, and a third generator set, operate the first generator set as an output generator in an exercise mode, and operate the second generator set and the third generator set as load generators in the exercise mode to use electrical power produced by the first generator set. The second generator set uses a second genset portion of the electrical power and the third generator set uses a third genset portion of the electrical power.

Another embodiment relates to a system that includes a first generator set, a second generator set, and a third generator set. The first generator set, the second generator set, and the third generator set are each selectively operable in a normal mode of operation with fueling to produce electrical power and a reverse mode of operation to use electrical power. A control unit is structured to operate the first generator set as an output generator in the normal mode of operation, operate the second generator set as one of a group of load generators in the reverse mode of operation to use a second genset portion of the electrical power produced by the first generator set, and operate the third generator set as one of the group of load generators in the reverse mode of operation to use a third genset portion of the electrical power produced by the first generator set.

Another embodiment relates to a method that includes synchronizing a first generator set, a second generator set, and a third generator set; operating the first generator set as an output generator in an exercise mode; operating the second generator set as one of a group of load generators in a reverse mode of operation to use a second genset portion of electrical power produced by the first generator set; and operating the third generator set as one of the group of load generators in the reverse mode of operation to use a third genset portion of the electrical power produced by the first generator set.

These and other features, together with the organization and manner of operation thereof, will become apparent from the following detailed description when taken in conjunction with the accompanying drawings.

DETAILED DESCRIPTION

Following below are more detailed descriptions of various concepts related to, and implementations of, methods, apparatuses, and systems for a generator set exercising system. The various concepts introduced above and discussed in greater detail below may be implemented in any number of ways, as the concepts described are not limited to any particular manner of implementation. Examples of specific implementations and applications are provided primarily for illustrative purposes.

Referring to the figures generally, the various embodiments disclosed herein relate to systems, apparatuses, and methods for exercising a generator set or multiple generator sets without the use of load banks or load cells. The figures generally show a power grid that includes a primary power source (e.g., a photovoltaic or solar array, a wind turbine, a coal power plant, etc.) and a bank of generator sets arranged to provide auxiliary or backup power to a load (e.g., electricity to a building such as a hospital). A controller manages operation of the primary power source and the bank of generator sets and couples the produced power to the load and/or to a battery system. The bank of generator sets provides power in the event of loss of power from the primary power source or in the event that the primary power source is not providing enough power to service the load.

The bank of generator sets can be exercised without the use of a load bank. During an exercise operation, the bank of generator sets is disconnected from the power grid and the load. All the generator sets in the bank of generator sets are started, run to a nominal speed, and synchronized (e.g., for voltage, frequency, and phase). Once synchronized, a first generator set is operated at a predetermined output (e.g., 40% of rated output capacity). The remaining generator sets in the bank of generator sets are run to present a load and used as an exercising load. For example, if the bank of generator sets includes five generator sets of equal power rating, each generator set acting as an exercising load would provide a 10% load, totaling 40% of the exercising generators output rating. It is noted that in alternate embodiments, generator sets of unequal power ratings can also be exercised with the present techniques. The first generator set is run for a predetermined amount of time to meet exercising requirements. After the first generator set has been exercised, a second generator set is exercised similarly, with the other generator sets run in reverse to provide the exercising load. Each generator set takes a turn at providing the output while the other generator sets provide the exercising load. In this way, each of the generator sets is exercised without the need for a load bank.

After each generator set has been exercised, all generator sets are transitioned to normal operation with fueling and then shut down. The generator sets are generally not shut down in reverse power mode. Running all generator sets before shut down also provides that synchronization is maintained, thereby reducing startup time in the event that the bank of generator sets is needed to provide power into the power grid.

Figure 1:
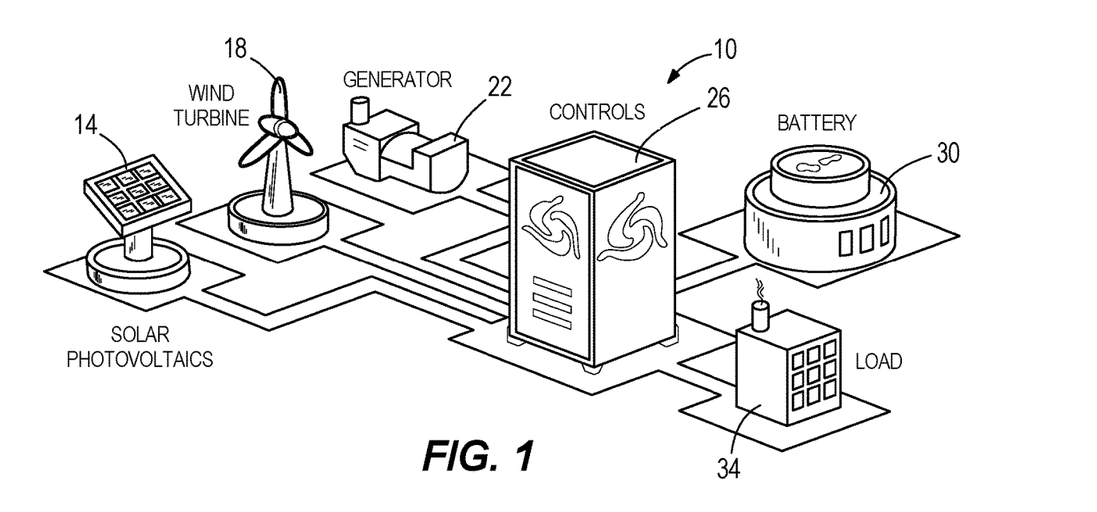
FIG. 1 is a perspective view of a power generation system including a generator system according to some embodiments.

As shown in FIG. 1, a power grid 10 includes a primary source of power in the form of a solar array 14 including one or more photovoltaic cells, and one or more wind turbine 18. The primary source of power provides electrical power to the power grid 10. In some embodiments, the solar array 14 is eliminated. In some embodiments, the wind turbine 18 is eliminated. In some embodiments, the battery 30 is eliminated. In some embodiments, the primary source of power includes a power plant (e.g., a coal burning power plant, a natural gas turbine, etc.) or another power source. The primary source of power provides a majority of the electric power used by the load 34 and/or stored in the battery 30 during normal operation.

A bank of generator sets 22 is electrically coupled to the power grid 10 to provide auxiliary or emergency power to the power grid 10 and thus, load 34 and/or the battery 30. In some embodiments, the bank of generator sets 22 is normally turned off, not electrically coupled to the power grid 10 and not providing electrical power to the load 34 and/or battery 30. The bank of generator sets 22 is turned on or activated when the load 34 demands more electrical power than is being produced by the primary source of power (e.g., the solar array 14 and the wind turbine 18) or available from the battery 30. In some embodiments, the bank of generator sets 22 may be utilized during peak usage times, when the primary source of power is down for maintenance, and/or when environmental factors reduce the output of the primary source of power (e.g., cloud cover, lack of wind, etc.). The bank of generator sets 22 may be used in other situations where additional electric power is demanded, as desired.

A control unit 26 is electrically coupled to the solar array 14, the wind turbine 18, and the bank of generator sets 22. The control unit 26 includes controls and sensors for monitoring the solar array 14, the wind turbine 18, and the bank of generator sets 22 to determine relative power outputs, demands of the load 34, and health factors relating to the power grid 10. The control unit 26 connects and disconnects each of the solar array 14, the wind turbine 18, and the bank of generator sets 22 from the power grid 10 selectively. Additionally, the control unit 26 includes processors and/or circuitry that controls operation of the bank of generator sets 22 in an exercise mode as described further below. The control unit 26 is structured to control operation of the individual generator sets 22a-e, including adjusting the operation of the generator sets 22a-e between normal operation with fueling, and reverse operation mode with no fueling or a limited fueling level to provide necessary engine operation.

A battery 30 is coupled to the control unit 26 to accept and store electrical energy received from the solar array 14, the wind turbine 18, and the bank of generator sets 22. The battery 30 is structured to provide stored electrical energy to the load 34 when needed (e.g., peak usage times etc.).

A load 34 is coupled to the power grid 10 to accept and use electrical energy. The load 34 changes with demand and provides feedback regarding usage and demand to the control unit 26. In some embodiments, the load 34 is a building such as a hospital, a machine, or any other load that requires power. In some embodiments, the power grid 10 is or forms a proportion of the load 34 (e.g., in peak shaving applications where the generator sets may be utilized to export power into the one or more of the power sources to meet peak demand of off-site loads).

Figure 2:
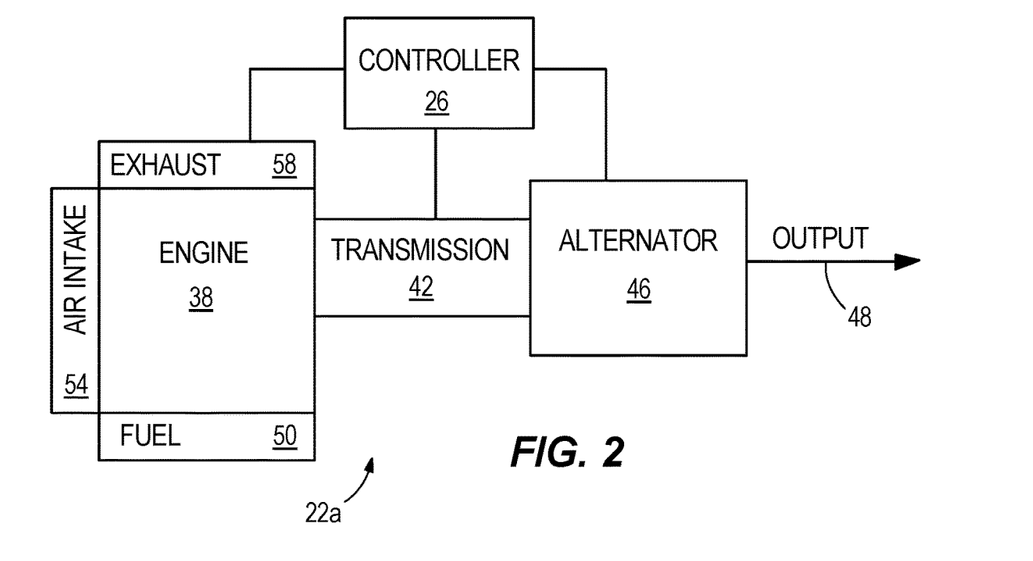
FIG. 2 is a schematic of a generator set of the generator system of FIG. 1 according to some embodiments.

In some embodiments, the bank of generator sets 22 includes five generator sets 22a-e. In some embodiments, the bank of generator sets 22 includes less than five or more than five generator sets, as desired. As shown in FIG. 2, each generator set 22a-e includes an engine 38, a transmission 42 coupled to the engine 38, and an alternator 46 coupled to the transmission 42. The generator set 22a is shown in FIG. 2, and in some embodiments, the generator sets 22b-e are identical. The engine 38 includes a fuel source 50 for providing fuel to a combustion chamber of the engine 38, an air intake 54 for providing fresh air to the combustion chamber of the engine 38, and an exhaust system 58 for treating any exhaust produced within the combustion chamber of the engine 38. In some embodiments, the fuel is a diesel fuel and the engine 38 is a compression ignition engine. In some embodiments, the fuel is a gaseous or liquid fuel and the engine 38 is a spark ignition engine. In some embodiments, the exhaust system 58 includes an aftertreatment system and a noise muffler system. The transmission 42 is structured to convert a mechanical rotational output of the engine 38 to a mechanical rotational output usable by the alternator 46. In some embodiments, the transmission 42 is eliminated and the engine 38 coupled directly to the alternator 46. In some embodiments, the alternator 46 includes a rotor driven by the transmission 42, and a stator within which the rotor rotates to convert mechanical energy into electric energy at an output 48.

In some arrangements, the generator set 22a can be run in a power generating mode with the engine 38 providing mechanical energy, and the alternator 46 converting the mechanical energy of the engine 38 into electrical energy at the output 48. In some arrangements, the generator set 22a can be run in a reverse power mode with electrical energy delivered to the output 48 and powering the alternator similar to an electric motor such that the rotor is rotated within the stator to convert the electrical energy delivered to the output 48 to rotation power, typically accomplished by electrically lagging the synchronous AC power delivered to the output 48. The rotational power is driven to the engine 38 via the transmission 42 such that the engine 38 acts as a load.

Figure 3:
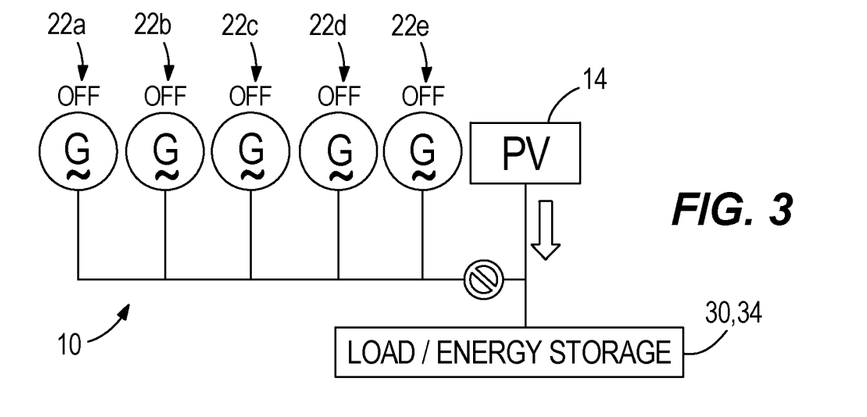
FIG. 3 is a schematic of the power generation system of FIG. 1 in a first configuration according to some embodiments.

As shown in FIG. 3, the bank of generator sets 22 and the solar array 14 (or another power source as desired) may be coupled to the battery 30 and/or the load 34. During normal operation, the bank of generator sets 22 is disconnected from the battery 30 and/or the load 34 and power is primarily provided by the solar array 14, local utility grid, or other power source. When the bank of generator sets 22 is needed, the control unit 26 takes action to bring the bank of generator sets 22 online so that additional power is provided to the power grid 10, battery 30 and/or load 34.

During initial setup of the bank of generator sets 22, all five generator sets 22a-e undergo a startup operation during which they are each brought up to a nominal operating speed and synchronized for operation. In some embodiments, the control unit 26 controls synchronization and voltage, frequency, and phase are all synchronized between the generator sets 22a-e and additionally between the bank of generator sets 22 and the power grid 10. If the generator sets 22a-e are then to provide power to the power grid 10 they would then be coupled to the power grid 10 by switch gear or an ATS switch. The power grid 10 can then disconnected from the local utility feed, solar panel 14, wind turbine 18, battery 30, or other power sources. Alternately, they can remain coupled to the power grid 10 and the generator sets 22a-e can be run in parallel to support them.

Figure 4:
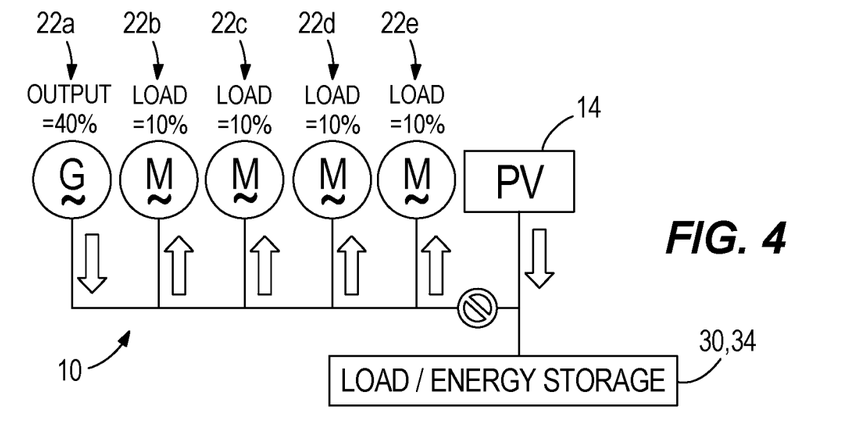
FIG. 4 is a schematic of the power generation system of FIG. 1 in a second configuration according to some embodiments.

During an exercise mode of operation, in one embodiment the generator sets 22a-e remain isolated from the power grid 10 and the control unit 26 arranges the already synchronized generator sets 22a-e selectively as output generator(s) or load generator(s) so that a closed loop load is provided. As shown in FIG. 4, the first generator set 22a is arranged as an output generator, and generator sets 22b-e are arranged as load generators. The output generator (e.g., the first generator set 22a) is started and run at an exercise rated output. In some embodiments, the exercise rated output is about forty percent (40%) of a rated output of the output generator. In some embodiments, the exercise rated output is at least thirty percent (30%) of a rated output of the output generator. In some embodiments, each of the generator sets 22a-e defines a minimum recommended output, and the exercise rated output is matched to the minimum recommended output. In some embodiments, the exercise rated output is larger than the minimum recommended output. For example, in some embodiments, the generator set 22b may have a different minimum recommended output than the generator set 22c and so on. In another embodiment the generator sets 22a-e remain are coupled to the power grid 10 and the control unit 26 arranges the synchronized generator sets 22a-e selectively as output generator(s) or load generator(s) to provide the exercise load. In yet another embodiment the generator sets 22a-e remain isolated, but are synchronized at a lower speed than required for coupling to the power grid 10 for a lower noise output. In another embodiment the generator sets 22a-e are kept isolated, but slowly ramp to full synchronized speed or a selected lower speed to lower noise output and human perception of their operation.

The load generators (e.g., generator sets 22b-e in FIG. 4) are run in reverse mode accepting electrical input at their respective outputs 48 and converting the electrical input to mechanical work. In some embodiments, the load generators are arranged to evenly distribute the load so that each of the load generators (e.g., the generator sets 22b-e) provides an equal load that in total provide the exercise rated output of the output generator (e.g., the generator set 22a).

The output generator (e.g., the generator set 22a) is operated at the exercise rated output for a predetermined exercise time. In some embodiments, the exercise time is defined as thirty minutes of operation with a stabilized coolant temperature. In other words, once the coolant temperature of the generator set 22a reaches steady state, the generator set 22a will continue operation as the output generator at the exercise rated output for thirty minutes. In some embodiments, the exercise time is more than thirty minutes or less than thirty minutes. In some embodiments, the exercise time is dictated by the manufacturer or installer.

Figure 5:
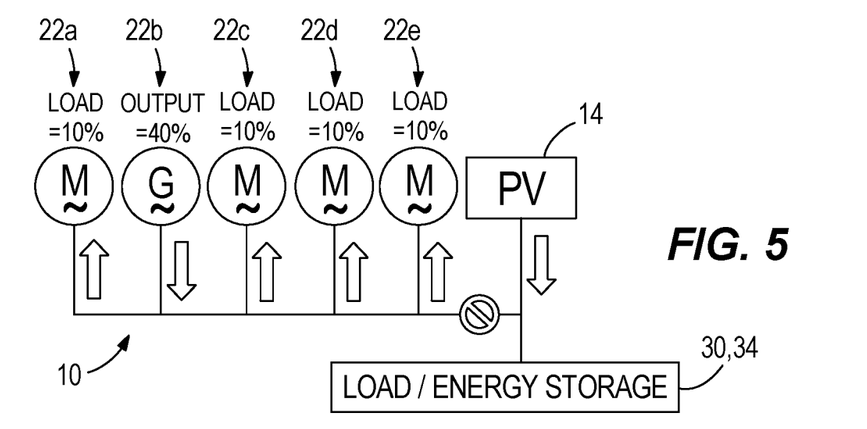
FIG. 5 is a schematic of the power generation system of FIG. 1 in a third configuration according to some embodiments.

As shown in FIG. 5, once the generator set 22a is done being exercised (e.g., having operated at the exercise rated output for the exercise time), then the next generator set 22b is operated as the output generator and the remaining generator sets 22a and 22c-e are operated as the load generators. After the generator set 22b has been run at the exercise rated output for the exercise time, then the next generator set 22c is exercised. The process continues until all the generators sets 22a-e in the bank of generator sets 22 have been exercised. In other embodiments two or more generator sets 22a-e of the bank of generator sets 22 are exercised at the same time and the load divided amongst the remaining generator sets 22a-e to minimize the overall exercise time required.

The bank of generators 22 is exercised on a predetermined exercise schedule. In some embodiments, the exercise schedule dictates that the bank of generator sets 22 is exercised once per month. In some embodiments, the National Fire Protection Association (NFPA) provides standards for the exercise schedule that must be met. In some embodiments, the standards (e.g., NFPA 110 standards, manufacturer standards, contractual requirements, etc.) require that each generator set 22a-e be exercised at the exercise rated output (e.g., thirty percent of rated output) for the exercise time (e.g., thirty minutes with stabilized coolant temperature) on the exercise schedule (e.g., once per month). Exercising the bank of generator sets 22 demonstrates that the engine 38 and generator set subsystems (e.g., the alternator 46) are functioning properly, maintains a coating of lubricating oil around bearings and other engine components, and maintains a coating of corrosion inhibitor throughout a cooling system of the engine 38.

After each of the generator sets 22a-e has been exercised (e.g., operated as the output generator), all the generator sets 22a-e are transitioned back to normal operation with fueling before being shut down. Running normally before shutdown avoids shutdown in the reverse power mode and provides that the bank of generator sets 22 is synchronized and ready for use.

Figures 6, 7:
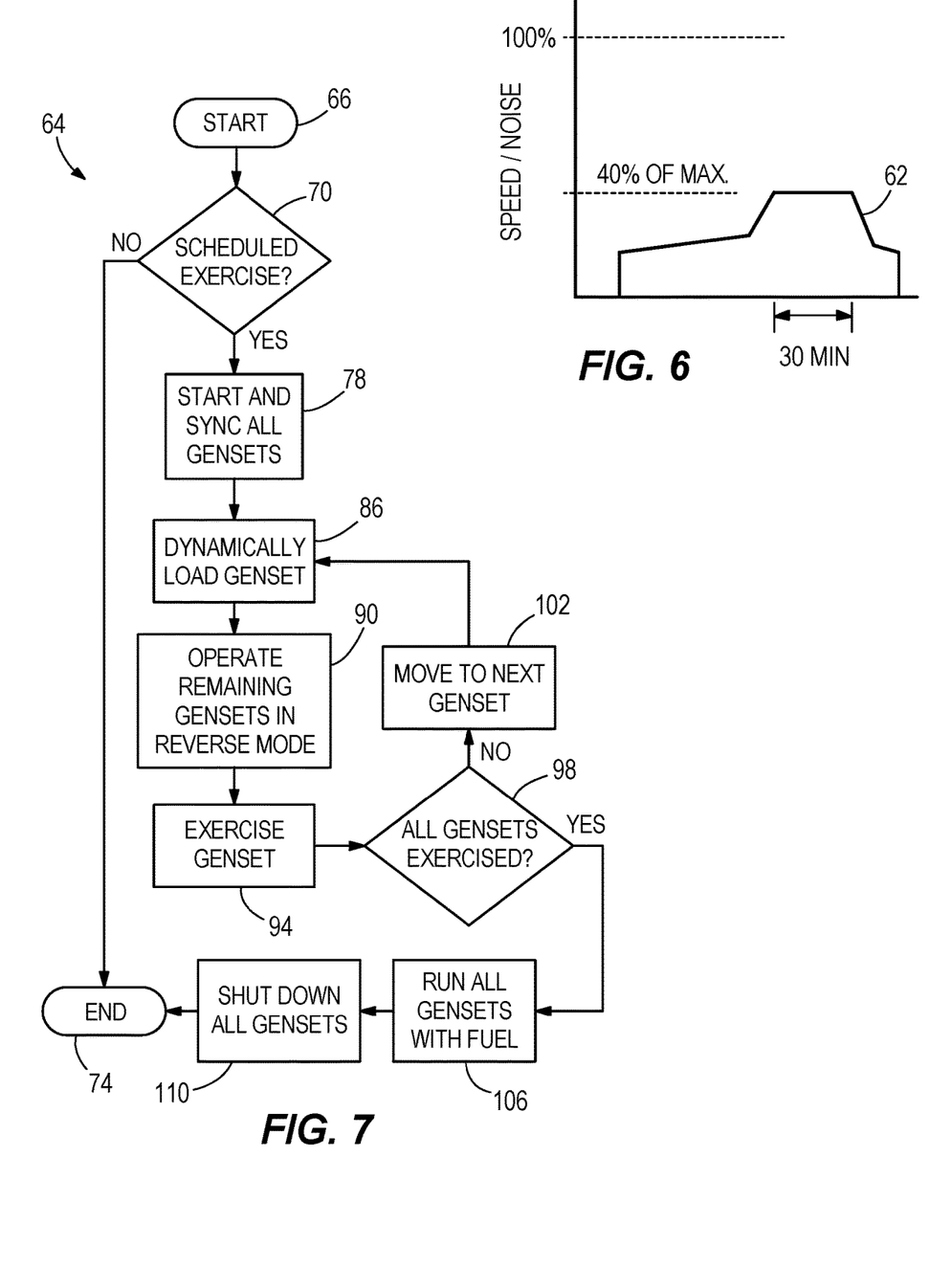
FIG. 6 is a graph showing an exemplary dynamic loading profile for use by the generator set of FIG. 2 according to some embodiments.
FIG. 7 is a flow chart showing an exercise mode according to some embodiments.

Dynamic loading and load profiles are also possible during operation in the exercise mode. For example, the exercise rated output can include a dynamic output profile. In some embodiments, the dynamic output profile reduces the output provided by the load generators after the stabilized coolant temperature is reached while continuing to maintain the stabilized coolant temperature. Lowering the load once the stabilized coolant temperature is reached can reduce energy usage during operation in the exercise mode and reduce wear of the bank of generator sets 22. In some embodiments, the dynamic output profile may include a ramped profile that gradually increases the output from the output generator in either power output or operational speed. In some embodiments, the dynamic output profile ramps linearly to the exercise rated output. In some embodiments, dynamic output profile includes a stepped profile. For example, FIG. 6 shows a stepped dynamic loading profile that gradually ramps up to the exercise rated output (e.g., 40% of total rated engine speed), then holds the engine speed at the exercise rated output for the exercise time (e.g., thirty minutes). After running for the exercise time, the stepped dynamic loading profile gradually ramps engine speed down to a stop. Dynamic output profiles may reduce strain on the generator sets 22a-e, and reduce noise output especially at startup. Reduced noise can decrease the incidence of startled users or individuals located near the generator sets 22. Additionally, reduced shock is introduced to a cold engine 38.

As shown in FIG. 7, an exemplary method 64 for exercising the bank of generator sets 22 includes starting to monitor the bank of generator sets 22 starts at step 66 and checks to see if an exercise is scheduled. In some embodiments, the controller 26 monitors on a set schedule (once per day) or recognizes a scheduled exercise upon receipt of an exercise signal (e.g., from a timer circuit, from and external signal, etc.). If no exercise is scheduled, the method 64 ends at step 74. If an exercise is scheduled, the method proceeds to step 78 and all the generator sets 22a-e are started and synchronized as discussed above. In some embodiments, the generator sets 22a-e are already operating and synchronized in a state suitable for exercising. In such cases, the controller 26 may determine that steps 78 can be eliminated from the method 64.

At step 86, the first generator set 22a is dynamically loaded and brought to the exercise rated output. Substantially simultaneously, the remaining generator sets 22b-e are arranged as load generators and the electrical output of the first generator 22a is accepted by the remaining generator sets 22b-e in reverse mode. At step 94 the first generator set 22a is exercised for the exercise time while the remaining generator sets 22b-e are operated in reverse mode with the exercise rated output split between them.

After the first generator set 22a has been exercised for the exercise time at step 94, the controller 26 determines if all generator sets in the bank of generator sets 22 have been exercised. If there are remaining generator sets that need to be exercised, then the method moves to the next generator set (e.g., 22b) at step 102 and returns to step 86 so the next generator set (e.g., 22b) can be exercised. The method 64 continues until all generator sets 22a-e are exercised at the exercise rated output for the exercise time.

The method 64 then proceeds to step 106 and all generator sets 22a-e are run with full fueling and synchronization is again checked. The generator sets 22a-e are then shut down at step 110 and the method 64 ends at step 74.

The exercise mode provides a number of benefits. The exercise mode reduces the cost, time, and space claim associated with load cell or load bank. For example, a user of the bank of generator sets 22 would not need to purchase, move, and store a load cell or load bank. Additionally, the exercise mode provides a fault current that can be used to power protection equipment. The bank of generator sets 22 is in a synchronized state before shutting down allowing for faster reaction. The faster reaction of the bank of generator sets 22 allows for quickened response in the event of active and/or reactive power demand or a power spike from the battery 30 and/or the load 34. Further, the ability of the bank of generator sets 22 to be maintained in a synchronized state allows for tests to be run at a lower speed, frequency, and voltage.

No claim element herein is to be construed under the provisions of 35 U.S.C. § 112(f), unless the element is expressly recited using the phrase "means for."

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members. For example, circuit A communicably "coupled" to circuit B may signify that the circuit A communicates directly with circuit B (i.e., no intermediary) or communicates indirectly with circuit B (e.g., through one or more intermediaries).

As mentioned above and in one configuration, the "circuits" of the control unit 26 may be implemented in machine-readable medium for execution by various types of processors. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Although the diagrams herein may show a specific order and composition of method steps, the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. All such modifications are intended to be included within the scope of the present disclosure as defined in the appended claims. Such variations will depend on the machine-readable media and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus, comprising:
a control unit structured to
communicate with a first generator set, a second generator set, and a third generator set,
operate the first generator set as an output generator in an exercise mode, and
operate the second generator set and the third generator set as load generators in the exercise mode to use electrical power produced by the first generator set, the second generator set using a second genset portion of the electrical power and the third generator set using a third genset portion of the electrical power.

2. The apparatus of claim 1, wherein the control unit is further structured to
operate the second generator set as the output generator in the exercise mode, and
operate the first generator set and the third generator set as the load generators in the exercise mode to use electrical power produced by the second generator set, the first generator set using a first genset portion of the electrical power and the third generator set using the third genset portion of the electrical power.

3. The apparatus of claim 1, wherein the control unit is further structured to start up and synchronize the first generator set, the second generator set, and the third generator set.

4. The apparatus of claim 1, wherein the control unit is further structured to
selectively connect the first generator set, the second generator set, and the third generator set to a power grid or a load, and
operate the first generator set, the second generator set, and the third generator set in a normal mode of operation where the first generator set, the second generator set, and the third generator set output power to the power grid or load.

5. The apparatus of claim 1, wherein the control unit is further structured to operate the first generator set at an exercise rated output while being exercised that is less than a rated output of the first generator set.

6. The apparatus of claim 1, wherein the control unit is further structured to operate the first generator set utilizing a dynamic loading profile in the exercise mode including one of a ramped increase to an exercise rated output and a step up profile to the exercise rated output.

7. The apparatus of claim 1, wherein the second genset portion is equal to the third genset portion.

8. A system, comprising:
a first generator set;
a second generator set;
a third generator set,
wherein the first generator set, the second generator set, and the third generator set are each selectively operable in a normal mode of operation with fueling to produce electrical power and a reverse mode of operation to use electrical power; and
a control unit structured to
operate the first generator set as an output generator in the normal mode of operation,
operate the second generator set as one of a group of load generators in the reverse mode of operation to use a second genset portion of the electrical power produced by the first generator set, and
operate the third generator set as one of the group of load generators in the reverse mode of operation to use a third genset portion of the electrical power produced by the first generator set.

9. The system of claim 8, wherein the control unit is further structured to
operate the second generator set as the output generator in the normal mode of operation, and
operate the first generator set as one of the group of load generators in the reverse mode of operation to use a first genset portion of the electrical power produced by the second generator set.

10. The system of claim 8, wherein the control unit is further structured to start up and synchronize the first generator set, the second generator set, and the third generator set.

11. The system of claim 8, wherein the control unit is structured to start operation of the first generator set in the normal mode of operation using a dynamic output profile including one of a ramped increase to an exercise rated output and a step up profile to the exercise rated output.

12. The system of claim 11, wherein the dynamic output profile utilizes a stepped profile up to an exercise rated output.

13. The system of claim 11, wherein the dynamic output profile decreases from an exercise rated output to a reduced output while maintaining a stabilized coolant temperature of the first generator set.

14. The system of claim 8, wherein the output generator is operated at thirty percent of a rated output.

15. A method, comprising:
synchronizing a first generator set, a second generator set, and a third generator set;
operating the first generator set as an output generator in an exercise mode;
operating the second generator set as one of a group of load generators in a reverse mode of operation to use a second genset portion of electrical power produced by the first generator set; and
operating the third generator set as one of the group of load generators in the reverse mode of operation to use a third genset portion of the electrical power produced by the first generator set.

16. The method of claim 15, further comprising:
operating the second generator set as the output generator in the exercise mode; and operating the first generator set as one of the group of load generators in the exercise mode to use a first genset portion of the electrical power produced by the second generator set.

17. The method of claim 15, wherein the second genset portion is equal to the third genset portion.

18. The method of claim 15, wherein the output generator is operated utilizing a dynamic loading profile.

19. The method of claim 18, wherein the dynamic loading profile includes one of a ramped increase to an exercise rated output and a step up profile to the exercise rated output.

20. The method of claim 18, wherein the dynamic output profile decreases from an exercise rated output to a reduced output while maintaining a stabilized coolant temperature of the first generator set.

* * * * *

UNITED STATES PATENT AND TRADEMARK OFFICE
CERTIFICATE OF CORRECTION

| | |
|---|---|
| PATENT NO. | : 10,924,043 B2 |
| APPLICATION NO. | : 16/200320 |
| DATED | : February 16, 2021 |
| INVENTOR(S) | : Oguguo et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 136 days.

Signed and Sealed this
Thirty-first Day of January, 2023

Katherine Kelly Vidal
*Director of the United States Patent and Trademark Office*